(12) United States Patent
Stluka et al.

(10) Patent No.: US 7,948,492 B2
(45) Date of Patent: May 24, 2011

(54) APPARATUS AND METHOD FOR VISUALIZATION OF OPERATING STATUS IN A PROCESS CONTROL SYSTEM

(75) Inventors: Petr Stluka, Prague (CZ); Roman Navratil, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 851 days.

(21) Appl. No.: 11/977,048

(22) Filed: Oct. 23, 2007

(65) Prior Publication Data

US 2009/0106652 A1    Apr. 23, 2009

(51) Int. Cl.
*G06T 11/20*   (2006.01)
(52) U.S. Cl. .................................... 345/440.2
(58) Field of Classification Search .................. 345/440, 345/440.1, 440.2
See application file for complete search history.

(56) References Cited

U.S. PATENT DOCUMENTS

| | | | |
|---|---|---|---|
| 5,974,391 A | 10/1999 | Hongawa | |
| 6,240,395 B1 | 5/2001 | Kumashiro | |
| 7,039,480 B2 | 5/2006 | Ooshima et al. | |
| 7,050,056 B2 | 5/2006 | Meyringer | |
| 7,760,203 B1 * | 7/2010 | Hao et al. | 345/440.2 |
| 2004/0095349 A1 * | 5/2004 | Bito et al. | 345/440 |
| 2005/0168467 A1 * | 8/2005 | Ankerst | 345/440 |
| 2007/0005266 A1 | 1/2007 | Blevins et al. | |
| 2009/0021517 A1 * | 1/2009 | Foslien | 345/440 |
| 2009/0231341 A1 * | 9/2009 | Lord et al. | 345/440 |

OTHER PUBLICATIONS

Honeywell International Inc., Operations Monitoring, Honeywell Product Documentation, Mar. 2, 2005, pp. 1-4.

* cited by examiner

*Primary Examiner* — Ryan R Yang
(74) *Attorney, Agent, or Firm* — Munck Carter, LLP (57) ABSTRACT

Deviations associated with a process system are identified, such as by identifying deviations of process variables or production measurements from target values. A graphical display is generated that identifies at least some of the deviations and one or more characteristics associated with the deviations. For example, the graphical display includes a time axis, and each deviation is associated with a bar positioned in the graphical display to identify a start time and an end time of the deviation along the time axis. Also, each bar may include one or more indicators (such as patterns, colors, or shadings) that identify the one or more characteristics (such as an economic impact and/or a cause) of each deviation identified in the graphical display. In this way, a user can, among other things, identify when deviations from target values occur, durations of the deviations, and economic impacts and/or causes associated with the deviations.

20 Claims, 7 Drawing Sheets

APPARATUS AND METHOD FOR VISUALIZATION OF OPERATING STATUS IN A PROCESS CONTROL SYSTEM

TECHNICAL FIELD

This disclosure relates generally to process control systems and more specifically to an apparatus and method for visualization of operating status in a process control system.

BACKGROUND

Processing facilities are often managed using process control systems. Example processing facilities include manufacturing plants, chemical plants, crude oil refineries, and other processing plants. Among other operations, process control systems typically manage the use of motors, valves, and other industrial equipment in the processing facilities.

An operations department in a processing facility is often responsible for systematic monitoring of the performance of the entire facility. For example, the operations department may be responsible for identifying failures to meet specified conditions within a processing facility, such as failures to keep processes within safety limits, meet production goals, or other requirements. The operations department may also be responsible for identifying problem areas within a processing facility, such as certain equipment or personnel failing to keep processes within safety limits, meet specified production goals, or other requirements.

SUMMARY

This disclosure provides an apparatus and method for visualization of operating status in a process control system.

In a first embodiment, a method includes identifying at least one deviation associated with a process system. The method also includes generating a graphical display that identifies the at least one deviation and at least one characteristic associated with each deviation. The graphical display includes a time axis, and each deviation is associated with a bar positioned in the graphical display to identify a start time and an end time of the deviation along the time axis. In addition, the method includes presenting the graphical display to a user.

In particular embodiments, the at least one characteristic includes an economic impact and/or a cause. Each bar may include a single indicator that identifies the economic impact or the cause. Each bar may also include a first indicator that identifies the economic impact and a second indicator that identifies the cause.

In other particular embodiments, multiple deviations are identified by the graphical display. The deviations are associated with multiple target values, and the graphical display is subdivided according to the target values. The target values may be associated with multiple target types, and the graphical display may identify the target type associated with each target value. The method could also include receiving information from the user defining whether the target values are based on equipment in the process system or instructions associated with the process system.

In yet other particular embodiments, the method further includes receiving information from the user defining a time period associated with the graphical display. Also, the at least one deviation may be selected from a larger set of deviations based on the time period.

In a second embodiment, an apparatus includes at least one memory configured to store information identifying at least one deviation associated with a process system. The apparatus also includes at least one processor configured to generate a graphical display that identifies the at least one deviation and at least one characteristic associated with each deviation and to present the graphical display to a user. The graphical display includes a time axis, and each deviation is associated with a bar positioned in the graphical display to identify a start time and an end time of the deviation along the time axis.

In a third embodiment, a computer program is embodied on a computer readable medium. The computer program includes computer readable program code for identifying at least one deviation associated with a process system. The computer program also includes computer readable program code for generating a graphical display that identifies the at least one deviation and at least one characteristic associated with each deviation. The graphical display includes a time axis, and each deviation is associated with a bar positioned in the graphical display to identify a start time and an end time of the deviation along the time axis. In addition, the computer program includes computer readable program code for presenting the graphical display to a user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
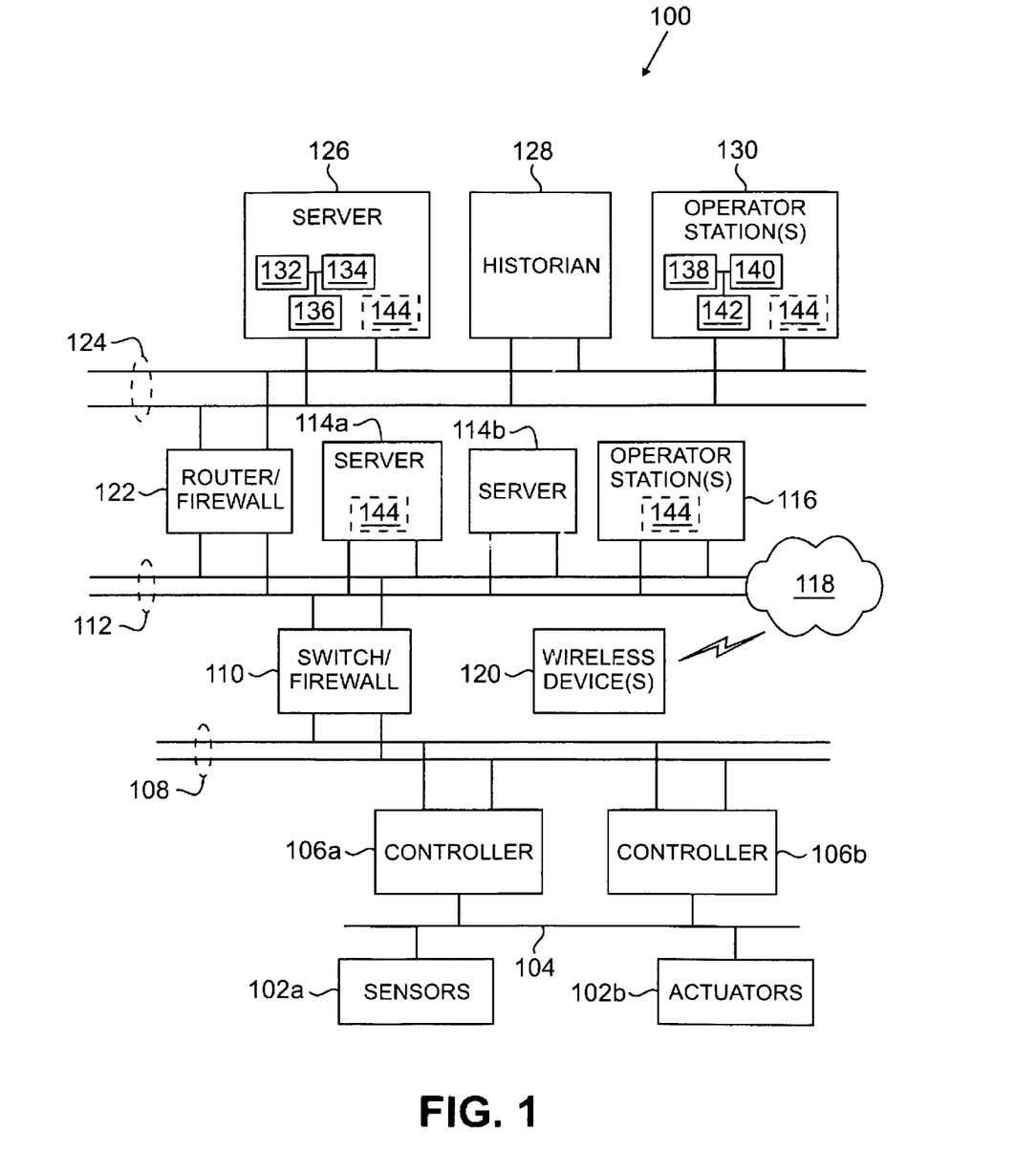
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or material, such as one or more sensors 102a and one or more actuators 102b. The sensors 102a and actuators 102b represent components in a process system that may perform any of a wide variety of functions. For example, the sensors 102a could measure a wide variety of characteristics in the process control system 100, such as temperature, pressure, or flow rate. Also, the actuators 102b can perform a wide variety of operations that alter the characteristics being monitored by the sensors 102a. As particular examples, the actuators 102b could represent electrical motors, hydraulic cylinders, or transducers. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b could, for example, represent multivariable controllers or other types of controllers that implement control logic (such as logic associating sensor measurement data to actuator control signals) to operate. Each of the controllers 106a-106b could, for example, represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any hardware, software, firmware, or combination thereof for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any hardware, software, firmware, or combination thereof for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

A historian 128 is also coupled to the networks 124. The historian 128 generally collects information associated with the operation of the system 100. For example, the historian 128 may collect measurement data associated with the operation of the sensors 102a. The historian 128 may also collect control data provided to the actuators 102b. The historian 128 may collect any other or additional information associated with the process control system 100. The historian 128 includes any suitable storage and retrieval device or devices, such as a database.

One or more operator stations 130 are coupled to the networks 124. The operator stations 130 represent computing or communication devices providing, for example, user access to the servers 114a-114b, 126 and the historian 128. Each of the operator stations 130 includes any hardware, software, firmware, or combination thereof for supporting user access and control of the system 100. Each of the operator stations 130 could, for example, represent a computing device running a MICROSOFT WINDOWS operating system.

In particular embodiments, the various servers and operator stations may represent computing devices. For example, each of the servers 114a-114b, 126 could include one or more processors 132 and one or more memories 134 for storing instructions and data used, generated, or collected by the processor(s) 132. Each of the servers 114a-114b, 126 could also include at least one network interface 136, such as at least one Ethernet interface. Also, each of the operator stations 116, 130 could include one or more processors 138 and one or more memories 140 for storing instructions and data used, generated, or collected by the processor(s) 138. Each of the operator stations 116, 130 could also include at least one network interface 142, such as at least one Ethernet interface.

In one aspect of operation, the process control system 100 often operates using one or more operating plans, such as plans designed by an operations department or other personnel. The operating plans typically identify the desired or intended operations to be performed or implemented in the system 100.

The process control system 100 is also typically associated with one or more operating limits, which generally represent limitations placed on the operation of the system 100. For example, the process control system 100 may be associated with various process variables, which represent various characteristics of the system 100. Also, computed variables could represent variables that are calculated by the system 100 using various process variables. The operating limits could represent limits placed on one or more of the process variables or computed variables. As particular examples, the operating limits could represent pressure limits, temperature limits, or other limits placed on the operation of the system 100. The operating limits could also represent limits placed on one or more production measurements associated with the system 100, such as a total quantity of a product to be produced during a specified time period.

In addition, it is often necessary or desirable to monitor the overall operation of the system 100 and identify problems in the system 100. For example, an operations department may routinely analyze various data associated with the system 100 and attempt to identify particular problems in the system 100. As a specific example, the operations department may attempt to identify any equipment or personnel that fail to keep processes within safety limits, meet specified production goals, or other requirements.

In accordance with this disclosure, the system 100 is capable of generating visual displays that facilitate identification of deviations that occur in the system 100. Deviations may generally represent any divergence from expected, desired, or required conditions, restrictions, or characteristics associated with the system 100. For example, the visual displays may identify deviations of various process or computed variables from their expected, desired, or required target values. The visual displays may also identify violations of various operating limits, such as safe limits placed on one or more of the process or computed variables. The visual displays may further identify various information associated with the deviations, such as the length of each deviation, a cause of each deviation, or an economic impact (such as an economic loss) associated with each deviation. Examples of the visual displays are provided in FIGS. 3 through 6, which are described below.

Among other things, these visual displays may allow an operations department or other personnel to easily monitor key production targets, and this monitoring can be done on various hierarchical levels. For example, the monitoring could be done for individual pieces of industrial equipment, a process unit (a collection of equipment), a facility area (a portion of a facility), an entire facility, and an enterprise (a collection of facilities). The visual displays may also allow deviation information to be presented in a manner that allows more convenient identification of problematic areas within one or more facilities. This may allow the operations department or other personnel to take steps to identify and reduce or eliminate various problems in the facilities.

In particular embodiments, the visual displays can be generated in the system 100 using one or more display generators 144. A display generator 144 could be implemented on any suitable component in the system 100, such as on one or more servers or operator stations. Also, any number of display generators 144 could be used within the system 100, such as on a single component (like the server 126) or on multiple components (like on each operator station 116 or 130). Each display generator 144 includes any suitable hardware, software, firmware, or combination thereof for generating one or more visual displays related to deviations in a process control system. The display generators 144 could, for example, represent software applications executed by processors in components within the system 100.

Although FIG. 1 illustrates one example of a process control system 100, various changes may be made to FIG. 1. For example, a control system could include any number of sensors, actuators, controllers, servers, operator stations, networks, wireless networks, wireless devices, and historians. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which visual displays containing deviation information can be used. This functionality could be used in any other suitable device or system.

Figure 2:
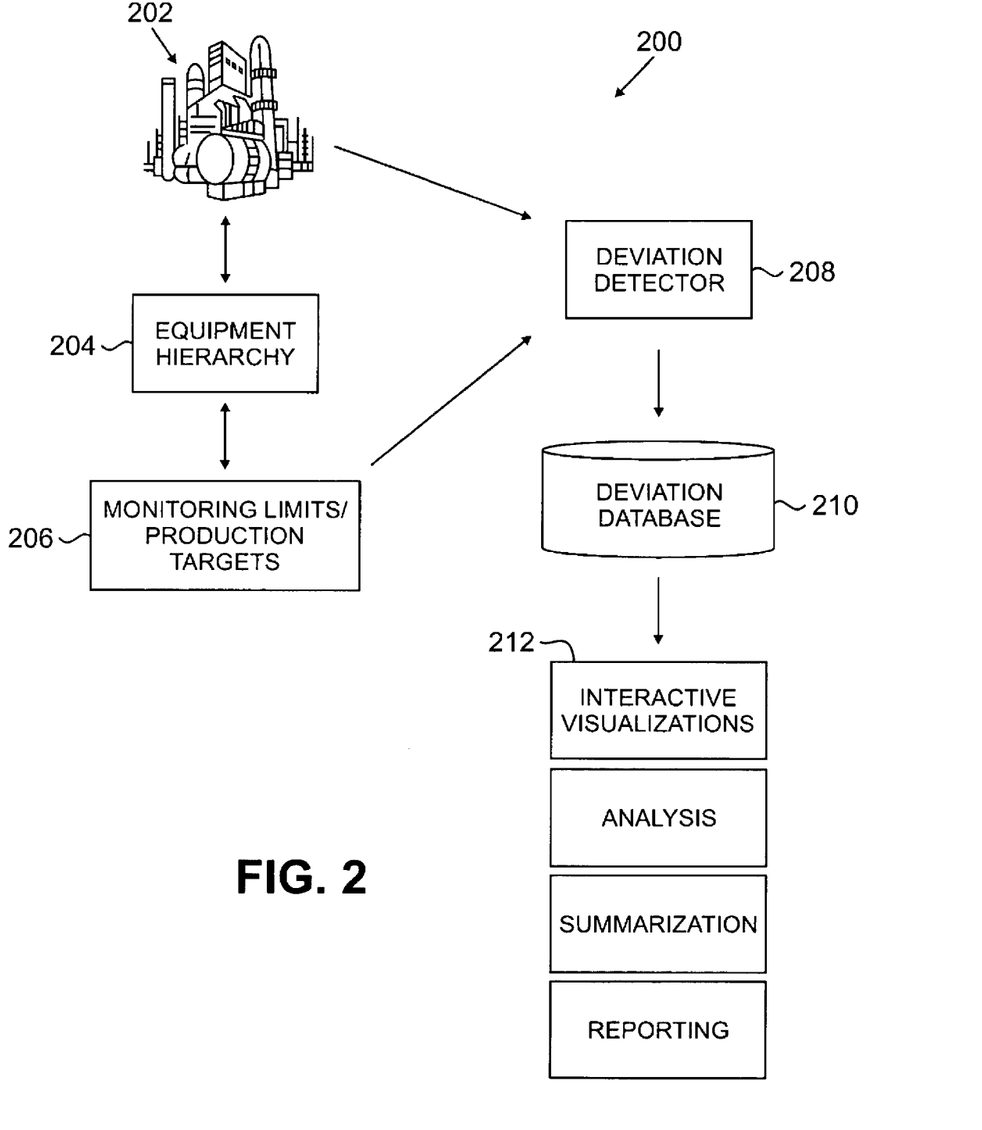
FIG. 2 illustrates an example technique for visualization of operating status in a process control system according to this disclosure.

FIG. 2 illustrates an example technique 200 for visualization of operating status in a process control system according to this disclosure. The embodiment of the technique 200 shown in FIG. 2 is for illustration only.

Other embodiments of the technique 200 may be used without departing from the scope of this disclosure. Also, for ease of explanation, the technique 200 shown in FIG. 2 is described with respect to the process control system 100 of FIG. 1. The technique 200 in FIG. 2 could be used with any suitable system.

As shown in FIG. 2, a process plant 202 generally represents a processing facility, a portion of a facility, or a combination of facilities or portions thereof. The process plant 202 could, for example, represent the various components shown in FIG. 1. The process plant 202 is typically divided into an equipment hierarchy 204. The equipment hierarchy 204 generally denotes various hierarchical levels of equipment in the process plant 202. The equipment hierarchy 204 could, for example, include hierarchical levels such as individual pieces of equipment, units, areas, facilities, and enterprises. Any other or additional hierarchical levels could be used in the equipment hierarchy 204.

The process plant 202 is also typically associated with various monitoring limits and production targets 206. The monitoring limits and production targets 206 generally represent requirements placed on the process plant 202. For example, the monitoring limits may represent limits placed on process or computed variables associated with the process plant 202. Violations of the monitoring limits may represent safety hazards, unsafe or sub-optimal operating conditions, or other conditions or situations in the process plant 202. The production targets may represent desired quantities of products or materials to be processed in the process plant 202.

Collectively, the monitoring limits and production targets 206 may generally represent any expected, desired, or required conditions, restrictions, or characteristics placed on the process plant 202. The compliance (or lack thereof) associated with these conditions, restrictions, or characteristics can be collectively described as the operating status of the process plant 202. In some embodiments, the monitoring limits and production targets 206 can be provided to, for example, the server 126 in the process control system 100 by authorized users.

The actual values of the process or computed variables in the process plant 202 may be monitored, such as by any of the controllers 106a-106b and/or the servers 114a-114b, 126. The actual process or computed variable values, along with the monitoring limits and production targets 206, are used by one or more deviation detectors 208. A deviation detector 208 generally operates to detect deviations of the actual process or computed variable values from the monitoring limits and production targets 206. For example, the deviation detector 208 may detect when a process or computed variable violates a monitoring limit placed on the variable. The deviation detector 208 may also detect when a facility or portion thereof fails to satisfy a production target. The deviation detector 208 could operate to identify any other deviations from expected, desired, or required conditions, restrictions, or characteristics placed on the process plant 202. The deviation detector 208 includes any suitable hardware, software, firmware, or combination thereof for detecting deviations from expected, desired, or required conditions, restrictions, or characteristics placed on one or more processing facilities or portions thereof. As a particular example, the deviation detector 208 could represent a service that is executed on a server or operator station at a specified interval, such as every five to thirty minutes.

At least some of the deviations identified by the deviation detector 208 are recorded in a deviation database 210. The deviation database 210 stores various information about detected deviations, such as a monitoring limit or production target that was violated, a duration of the deviation, and a reason for the deviation (such as in the form of a reason code). Other information associated with detected deviations could include an identification of personnel associated with a deviation (such as a shift identifier identifying a work shift), the level of the equipment hierarchy associated with the deviation, and an operating instruction associated with the deviation. The operating instruction could represent the operation being performed in the process plant 202 when the deviation occurred. Any other or additional information associated with detected deviations could be stored in the deviation database 210. The deviation database 210 includes any suitable storage and retrieval device or devices. The deviation database 210 could, for example, represent a relational database that stores deviation information in a single dedicated table. As a particular example, the deviation database 210 could represent part of the historian 128 or other component(s) in the system 100.

The deviation information stored in the deviation database 210 could be used to support various functions 212. For example, the deviation information could be used to create interactive visualizations (such as graphical displays shown in FIGS. 3 through 6, which are described below). The deviation information could also be used by analysis functions, such as to identify causes or economic impacts associated with detected deviations. The deviation information could be further used by summarization functions, such as for summarizing deviations and their associated causes or economic impacts over time. In addition, the deviation information could be used for reporting functions, such as for generating reports identifying deviations and their associated causes or economic impacts. The deviation information could be used in any other or additional manner.

In particular embodiments, OPERATIONS MONITORING software available from HONEYWELL PROCESS SOLUTIONS can be used in conjunction with components 206-210 in FIG. 2. For example, the OPERATIONS MONITORING software could enable the monitoring limits and production targets 206 to be entered by users or automatically loaded from other portions of the process control system 100. The OPERATIONS MONITORING software could also implement the deviation detector 208, which detects deviations of actual values from the monitoring limits and production targets 206. In addition, the OPERATIONS MONITORING software could implement or support the deviation database 210.

Although FIG. 2 illustrates one example of a technique 200 for visualization of operating status in a process control system, various changes may be made to FIG. 2. For example, the deviation information could be stored in one or multiple locations. Also, multiple detectors 208 could be used to detect deviations associated with the process plant 202.

FIGS. 3 through 6 illustrate example graphical displays supporting visualization of operating status in a process control system according to this disclosure. The graphical displays shown in FIGS. 3 through 6 are for illustration only. Other embodiments of the graphical displays could be used without departing from the scope of this disclosure. Also, for ease of explanation, the graphical displays in FIGS. 3 through 6 are described with respect to the deviation information collected or generated as shown in FIG. 2 within the system 100 of FIG. 1. Any other or additional graphical displays could be used in the system 100, and the graphical displays in FIGS. 3 through 6 may be used in any other suitable system.

Figure 3:
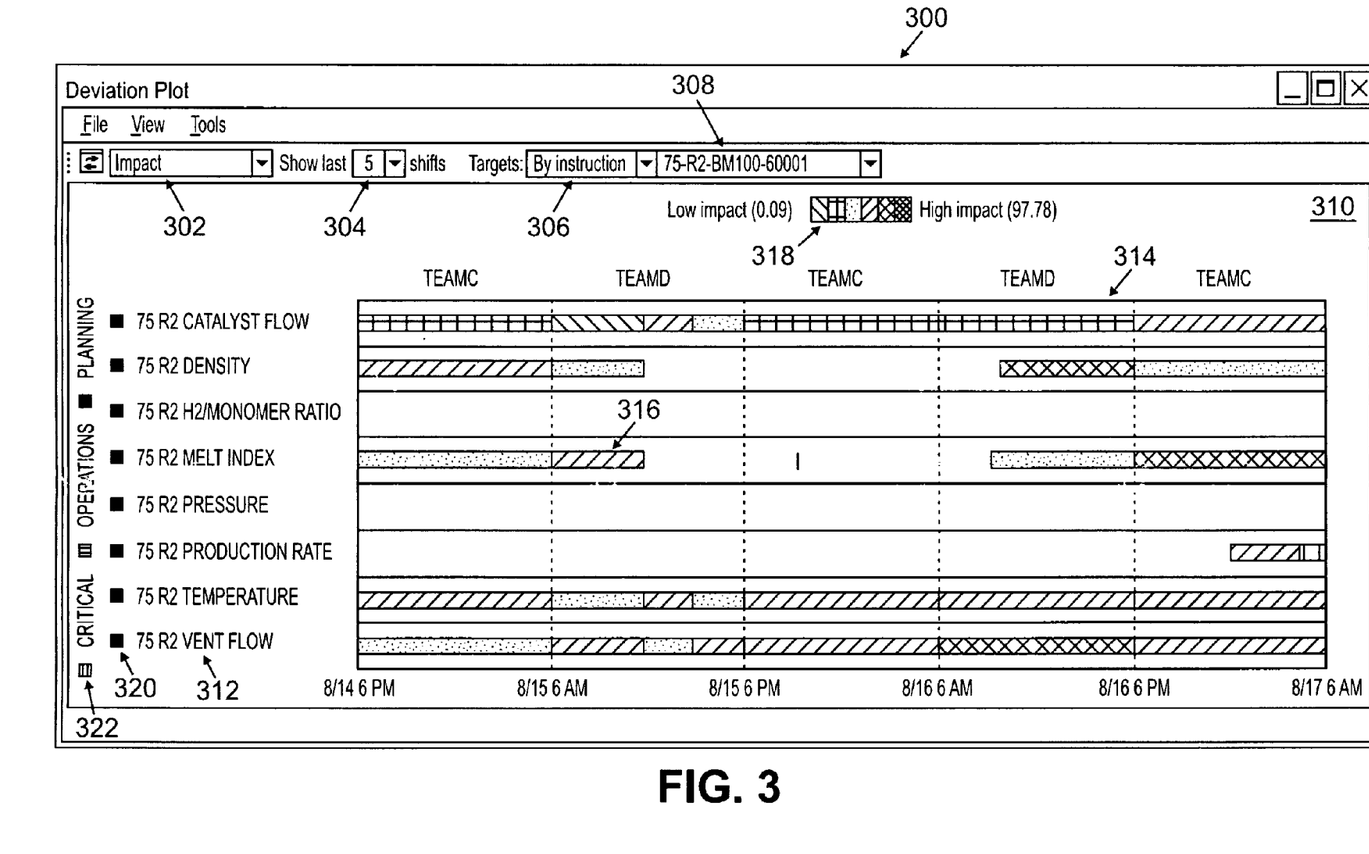
FIGS. 3 through 6 illustrate example graphical displays supporting visualization of operating status in a process control system according to this disclosure.

In FIG. 3, a graphical display 300 is used to illustrate the economic impact of deviations that occur during a specified number of work shifts. In this example, the graphical display 300 includes various controls 302-308 for filtering or otherwise controlling the deviation information that is displayed in the graphical display 300. For example, the control 302 can be used to control the type of deviation information displayed, such as whether the economic impacts and/or the causes of the deviations are displayed. In this particular example, the control 302 represents a drop-down menu that allows the user to select economic impact, reason (cause), or both. However, any other suitable input mechanism could be used to identify the type of deviation information that is displayed.

The control 304 can be used to control the time period for which the deviation information is displayed. For example, the control 304 could be used to identify the number of work shifts for which the deviation information is displayed. In this particular example, the control 304 represents a drop-down menu that allows the user to select one of a predetermined number of work shifts. The control 304 could, for instance, allow the user to select the five, ten, fifteen, or twenty most recent work shifts. However, any other suitable input mechanism could be used to identify the time period for which the deviation information is displayed.

The control 306 can be used to control the subdivision of the deviation information that is displayed. For example, the control 306 could be used to control whether deviation information is displayed for equipment or for instructions. If equipment is selected, the graphical display 300 presents deviation information subdivided by equipment. If instruction is selected, the graphical display 300 presents deviation information subdivided by instruction. In this particular example, the control 306 represents a drop-down menu that allows the user to subdivide the deviation information by equipment, by instruction, or according to a user-specified subdivision. However, any other suitable input mechanism could be used to identify the subdivision of the deviation information that is displayed.

An additional control 308 can be used in conjunction with the control 306. The control 308 could be used to control the specific equipment or instructions for which deviation information is displayed. For example, if equipment is selected using the control 306, the control 308 could provide a list of equipment that can be selected by the user. If instruction is selected using the control 306, the control 308 could provide a list of instructions that can be selected by the user. In this particular example, the control 308 represents a drop-down menu that allows the user to select particular equipment or instructions. If a user-specified subdivision is selected using the control 306, the control 308 could be replaced by one or more buttons allowing the user to select or change a user-specified subdivision. However, any other suitable input mechanism could be used to identify the equipment or instruction for which deviation information is displayed.

Based on the selections made using the controls 302-308, deviation information is displayed in a display area 310. In this example, each row 312 of the display area 310 represents a specific target, such as a specific monitoring limit or production target 206, associated with the equipment or instruction identified by the user. Also, each column 314 of the display area 310 represents a specified period of time, such as an individual work shift.

As shown in FIG. 3, the display area 310 includes various bars 316. Each bar 316 represents a deviation from one of the targets identified in the rows 312. If a deviation for a specific target occurs during a specified work shift, a bar 316 can be displayed in the appropriate row 312 and column 314 in the display area 310. Also, each bar 316 could start at the time that a deviation begins, and the length of each bar 316 could be proportional to the length of the associated deviation. If multiple deviations for a specific target occur during a specified work shift, multiple bars 316 can be displayed in the appropriate row 312 and column 314 in the display area 310. If no deviations occur for a specific target during a specified work shift, no bar may be displayed in the appropriate row 312 and column 314 in the display area 310.

Moreover, the bars 316 in the display area 310 identify the economic impacts of the deviations. In this example, the patterns of the bars 316 can vary depending on the economic impact of the deviations. Also, a legend 318 can be provided that identifies the various levels of economic impact associated with the deviations. A user can therefore easily identify the economic impact associated with a particular deviation using the pattern associated with a particular bar 316. It may be noted that while patterns are used to distinguish different levels of economic impact in FIG. 3, other indicators could also be used (such as different colors or levels of shading). It may also be noted that any suitable number of patterns, colors, or other identifiers could be used to denote different levels of economic impact. In this document, the term "bar" refers to any structure capable of identifying a position in time and a length of a deviation, whether the bar is rectangular or has some other shape.

In addition, each of the targets identified in the rows 312 has an associated type indicator 320. The type indicators 320 identify different types of targets. Also, a legend 322 can be used to identify the different types of targets. In this example, planning targets relate to specific quantities of a product to be produced or other types of decisions made with respect to the process plant 202. Operations targets relate to the general operation of the process plant 202, such as a target reactor temperature or other conditions or characteristics in the process plant 202. Critical targets relate to important operational characteristics of the process plant 202, such as critical temperature or pressure limitations. It may be noted that while patterns are used to distinguish different types of targets in FIG. 3, other indicators could also be used (such as different colors or levels of shading). It may also be noted that any suitable number of patterns, colors, or other identifiers could be used to denote different types of targets.

Using this graphical display 300, a user can easily identify when deviations from specified targets occur. Moreover, the user can easily identify the economic impact associated with each of the deviations. Further, the user can easily identify whether the deviations are associated with critical types of targets or other types of targets. In addition, the user can easily vary the deviation information displayed using the controls 302-308.

Figure 4:
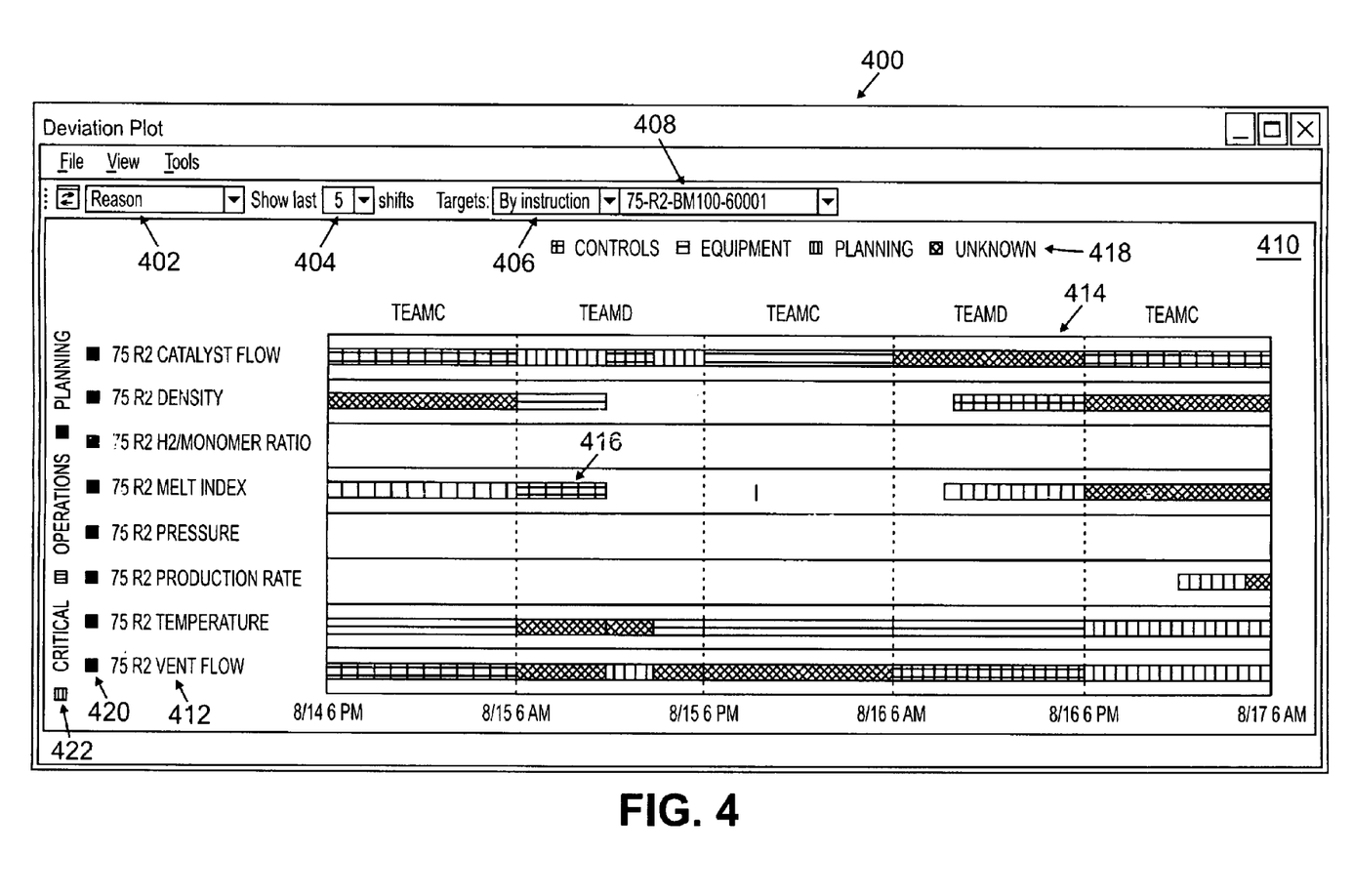

In FIG. 4, a graphical display 400 is similar to the graphical display 300 in FIG. 3. For example, the graphical display 400 includes controls 402-408, which can be used to control the deviation information displayed in a display area 410. In this example, each row 412 in the display area 410 represents a specific target, and each column 414 in the display area 410 represents a specified period of time. Bars 416 can be displayed in the appropriate rows 412 and columns 414 to identify deviations that occurred during the specified periods of time.

In this example, the bars 416 and a legend 418 identify the causes of the deviations. For example, deviations could be caused by inappropriately configured control loops in the process plant 202, such as when a controller 106a-106b is not able to reach desired target values of process variables in the process plant 202. Deviations could also be caused by equipment problems, such as failures of sensors 102a or actuators 102b. Deviations could further be caused by planning errors, such as unrealistic production goals. In addition, deviations could be associated with unknown causes. Each of these types of causes is associated with a different pattern in FIG. 4. It may be noted that while patterns are used to distinguish different causes of deviations in FIG. 4, other indicators could also be used (such as different colors or levels of shading). It may also be noted that any suitable number of patterns, colors, or other identifiers could be used to denote different causes of deviations.

In addition, each of the targets identified in the rows 412 has an associated type indicator 420, and a legend 422 can identify different types of targets. Once again, it may be noted that while patterns are used to distinguish different types of targets in FIG. 4, other indicators could also be used, and any suitable number of indicators could be used.

Using this graphical display 400, a user can easily identify when different deviations from specified targets occur. Moreover, the user can easily identify the cause associated with each of the deviations. Further, the user can easily identify whether the deviations are associated with critical types of targets or other types of targets. In addition, the user can easily vary the deviation information displayed using the controls 402-408.

Figure 5:
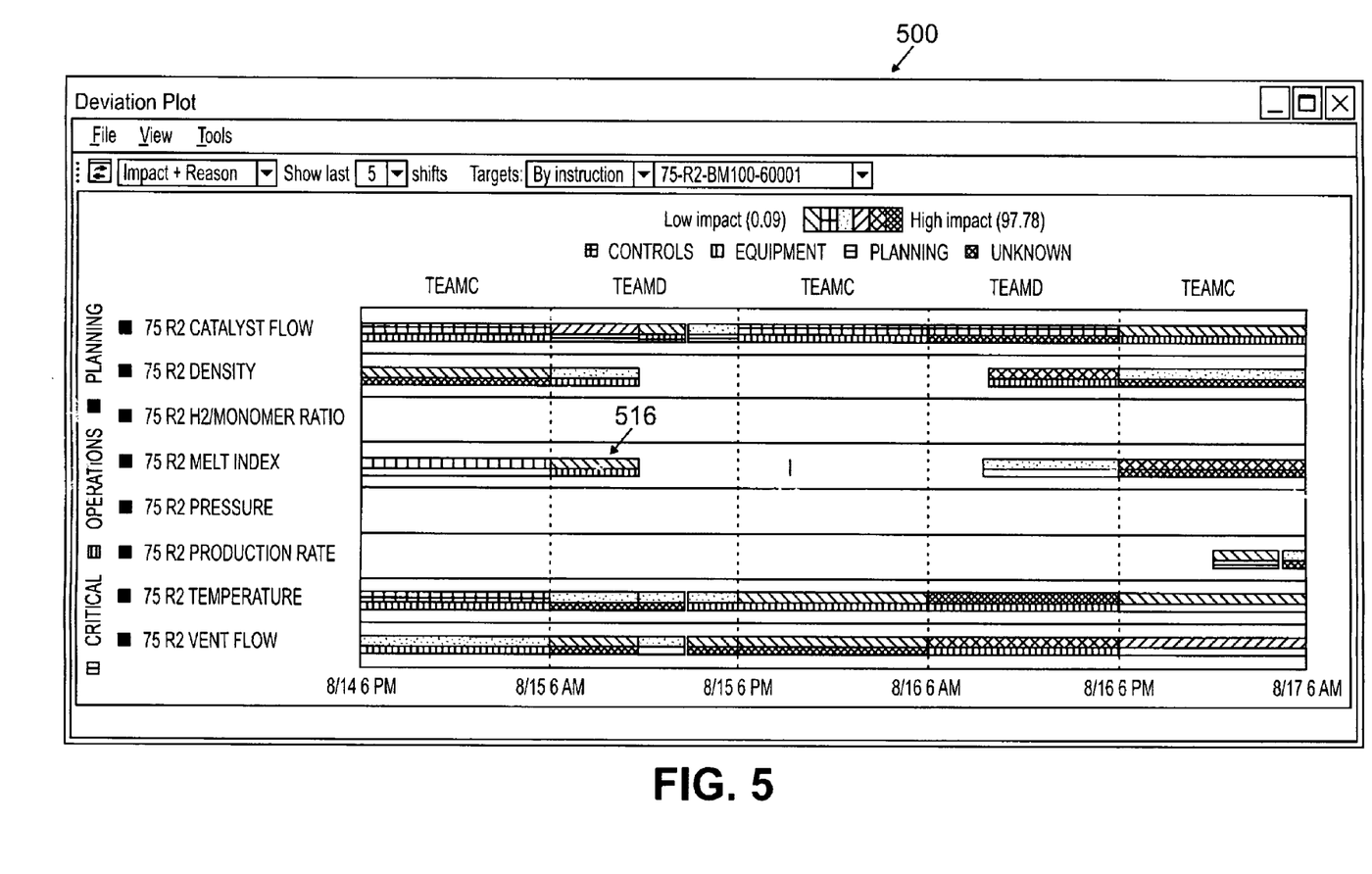

In FIG. 5, a graphical display 500 is similar to the graphical displays 300 and 400 in FIGS. 3 and 4. In this example, the graphical display 500 includes bars 516 that identify both the economic impacts and the causes associated with the identified deviations. Specifically, the upper portion of each bar 516 could use the same indicators contained in the legend 318 (for economic impacts), and the lower portion of each bar 516 could use the same indicators contained in the legend 418 (for deviation cause).

Figure 6:
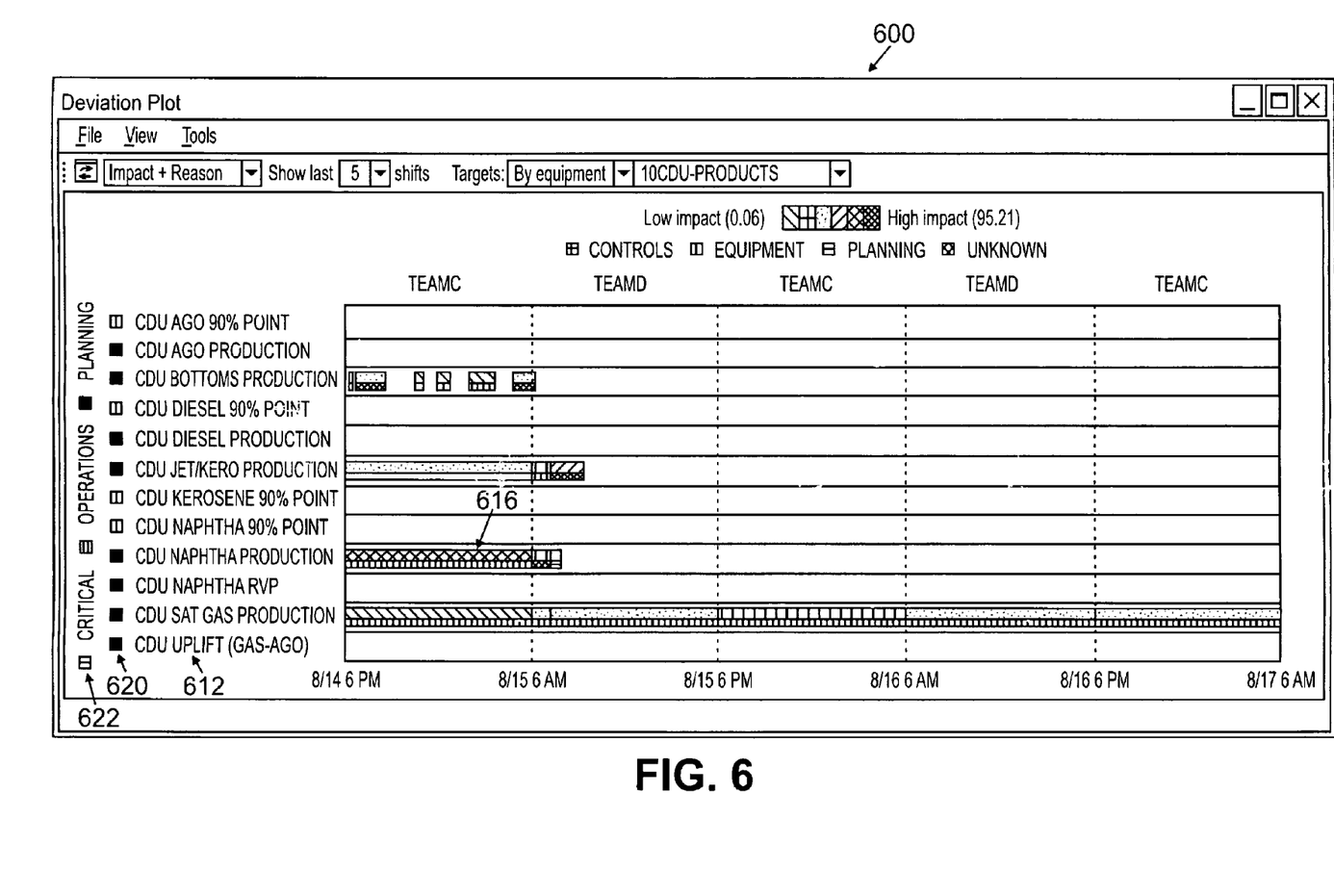

In FIG. 6, a graphical display 600 is similar to the graphical display 500 in FIG. 5. Again, the graphical display 600 includes bars 616 that identify both the economic impacts and the causes associated with the deviations (where economic impacts are identified by the upper portions of the bars 616 and causes are identified by the lower portions of the bars 616). Also, in this example, the rows 612 are associated with equipment in the process plant 202, each having an associated type indicator 620 that is defined in a legend 622.

In some embodiments, the various graphical displays 300-600 shown in FIGS. 3 through 6 are generated based on the deviation information stored in the deviation database 210. The graphical displays 300-600 can also be refreshed as additional deviation information is identified, such as when additional deviation information is added to the deviation database 210. For example, a synchronization mechanism can be used between a display generator 138 and the deviation detector 208 or the deviation database 210, which allows the display generator 138 to receive additional deviation information when it becomes available. In addition, the graphical displays 300-600 can be presented to users in any suitable manner, such as on the operator stations in the process control system (although any other presentation technique could be used).

In particular embodiments, the economic impacts and the deviation causes identified in the graphical displays 300-600 could be determined in any suitable manner. For example, the economic impact and the cause of each deviation could be identified by a user in the system, and the economic impact and the cause could be stored (along with other information) in the deviation database 210.

As another example, the economic impact and the cause of a deviation could be determined automatically. For example, the economic impact of a deviation could be determined based on the deviation itself, a peak of the deviation from a target value, or an integral of the deviation from a target value. Any other or additional criteria could be used to automatically determine the economic impact or cause of a deviation. As a particular example, the OPERATIONS MONITORING software from HONEYWELL PROCESS SOLUTIONS can assign an economic impact to an individual deviation after a user configures an impact type (defining how to perform the economic impact calculation) and the factors for identifying when a deviation is above a maximum and below a minimum threshold. The user may specify that an economic impact is a constant, is proportional to its duration, is proportional to a magnitude of the deviation, or integrated over the entire deviation. The calculations may also be based on impact factors, which can be constant or variable.

Although FIGS. 3 through 6 illustrate examples of graphical displays 300-600 supporting visualization of operating status in a process control system, various changes may be made to FIGS. 3 through 6. For example, the layout and arrangement of the graphical displays 300-600 are for illustration only. Also, any other or additional contents can be provided in the graphical displays 300-600. Further, other or additional information (instead of or in addition to the economic impact and cause) could be presented in a graphical display. In addition, other or additional subdivisions (instead of or in addition to equipment and instruction) could be used to subdivide the deviation information presented in a graphical display.

Figure 7:
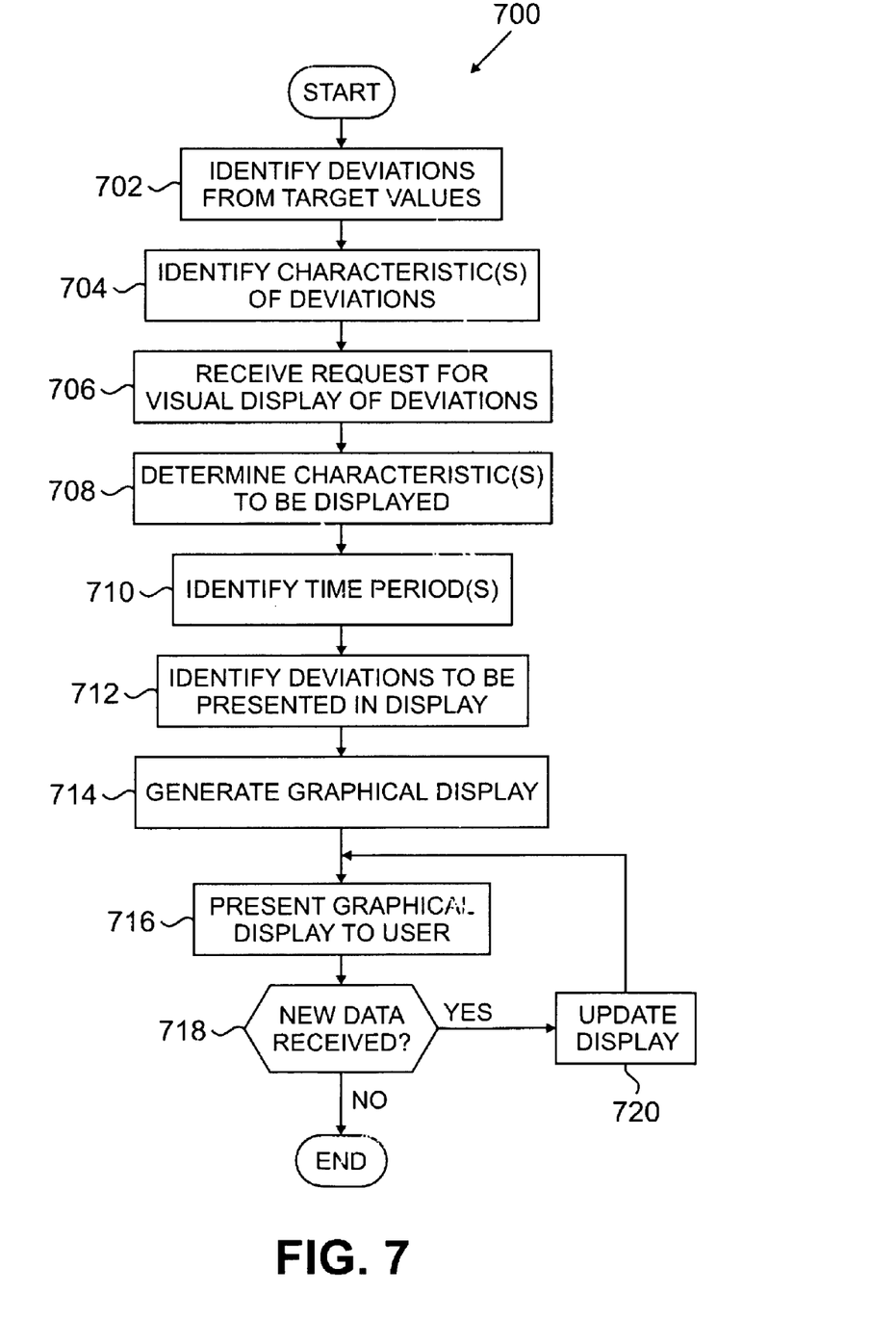
FIG. 7 illustrates an example method for visualization of operating status in a process control system according to this disclosure.

FIG. 7 illustrates an example method 700 for visualization of operating status in a process control system according to this disclosure. The embodiment of the method 700 shown in FIG. 7 is for illustration only.

Other embodiments of the method 700 may be used without departing from the scope of this disclosure. Also, for ease of explanation, the method 700 is described with respect to the graphical displays 300-600 in FIGS. 3 through 6 used in the process control system 100 of FIG. 1. The method 700 could be used in conjunction with any suitable graphical display and in any suitable system.

One or more deviations from target values for a process control system are identified at step 702. This may include, for example, various sensors measuring process variables associated with a process plant 202. This may also include controllers or servers calculating values for various computed variables. This may further include taking measurements of production quantities produced during specified time periods. In addition, this may include a deviation detector 208 determining if and when these values deviate from various monitoring limits and production targets 206. In some embodiments, a divergence from a monitoring limit or production target may need to exceed a threshold before being classified as an actual recordable deviation.

One or more characteristics of the deviations are determined at step 704. This may include, for example, receiving information from users that identify the economic impacts and/or causes of the deviations. This may also include a server, operator station, or other component automatically determining the economic impact and/or cause of each deviation.

A request for visual display of deviation information is received at step 706. This may include, for example, a user submitting a request from an operator station to a display generator 144. This could also include an automatically-generated request to refresh an existing plot as described above.

The characteristics of the deviations to be displayed are identified at step 708, and one or more time periods are identified at step 710. This may include, for example, the display generator 144 identifying the settings of various user controls (such as controls 302-308 and/or 402-408). As particular examples, the user can select to view economic impacts, causes, or both, and the user can select a specified number of work shifts to be viewed.

One or more deviations to be presented in the display are identified at step 712. This may include, for example, the display generator 144 determining whether any deviations occurred during the time periods identified in step 710. If not, no deviations need to be identified in the display. Otherwise, if at least one deviation is identified, various information about the deviation(s) can be identified, such as the start time and duration of each deviation or the start time and end time of each deviation (which can be used to define the beginning and the length of a bar in a graphical display).

A graphical display is generated at step 714. This may include, for example, the display generator 144 generating a display area having rows associated with target values and columns associated with time periods. This may also include the display generator 144 placing bars in the appropriate rows and columns to identify the deviations that occurred for specific targets during specific time periods. In addition, one or more patterns, colors, or other indicators can be provided for each bar, depending on the economic impact and/or cause associated with the bar's deviation. The graphical display is then presented to a user at step 716, which may include presenting the generated display on a display device and/or communicating information defining the generated display over a network to a user device.

If additional deviation data is received while the graphical display is being presented at step 718, the display can be updated at step 720 and re-presented to the user. In this way, the graphical display can be refreshed as new data becomes available.

Although FIG. 7 illustrates one example of a method 700 for visualization of operating status in a process control system, various changes may be made to FIG. 7. For example, while shown as a series of steps, various steps in FIG. 7 could overlap, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
identifying at least one deviation associated with a process system;
generating a graphical display that identifies the at least one deviation and at least one characteristic associated with each deviation, wherein the graphical display includes a time axis, and wherein each deviation is associated with a bar positioned in the graphical display to identify a start time and an end time of the deviation along the time axis; and
presenting the graphical display to a user.

2. The method of claim 1, wherein the at least one characteristic comprises at least one of: an economic impact and a cause.

3. The method of claim 2, wherein each bar comprises a single indicator that identifies one of: the economic impact and the cause.

4. The method of claim 2, wherein each bar comprises a first indicator that identifies the economic impact and a second indicator that identifies the cause.

5. The method of claim 1, wherein:
multiple deviations are identified by the graphical display, the deviations associated with multiple target values; and
the graphical display is subdivided according to the target values.

6. The method of claim 5, wherein:
the target values are associated with multiple target types; and
the graphical display identifies the target type associated with each target value.

7. The method of claim 6, further comprising:
receiving information from the user defining whether the target values are based on equipment in the process system or instructions associated with the process system.

8. The method of claim 1, further comprising:
receiving information from the user defining a time period associated with the graphical display.

9. The method of claim 8, wherein identifying the at least one deviation comprises selecting the at least one deviation from a larger set of deviations based on the time period.

10. An apparatus comprising:
at least one memory configured to store information identifying at least one deviation associated with a process system; and
at least one processor configured to:
generate a graphical display that identifies the at least one deviation and at least one characteristic associated with each deviation, wherein the graphical display includes a time axis, and wherein each deviation is associated with a bar positioned in the graphical display to identify a start time and an end time of the deviation along the time axis; and
present the graphical display to a user.

11. The apparatus of claim 10, wherein:
the at least one characteristic comprises at least one of: an economic impact and a cause; and
each bar comprises at least one indicator that identifies at least one of: the economic impact and the cause.

12. The apparatus of claim 10, wherein:
multiple deviations are identified by the graphical display, the deviations associated with multiple target values;
the graphical display is subdivided according to the target values; and
the graphical display identifies a target type associated with each target value.

13. The apparatus of claim 12, wherein the at least one processor is further configured to receive information from the user defining whether the target values are based on equipment in the process system or instructions associated with the process system.

14. The apparatus of claim 10, wherein the at least one processor is further configured to receive information from the user defining a time period associated with the graphical display.

15. The apparatus of claim 14, wherein the at least one processor is configured to identify the at least one deviation by selecting the at least one deviation from a larger set of deviations based on the time period.

16. The apparatus of claim 15, wherein the at least one processor is further configured to identify the deviations in the larger set of deviations.

17. The apparatus of claim 10, wherein:
the apparatus further comprises a network interface; and
the at least one processor is configured to present the graphical display to the user by transmitting information defining the graphical display to a device associated with the user over at least one network.

18. A tangible computer readable storage medium embodying a computer program, the computer program comprising computer readable program code for:
identifying at least one deviation associated with a process system;
generating a graphical display that identifies the at least one deviation and at least one characteristic associated with each deviation, wherein the graphical display includes a time axis, and wherein each deviation is associated with a bar positioned in the graphical display to identify a start time and an end time of the deviation along the time axis; and
presenting the graphical display to a user.

19. The computer readable storage medium of claim 18, wherein:
the at least one characteristic comprises at least one of: an economic impact and a cause; and
each bar comprises at least one indicator that identifies at least one of: the economic impact and the cause.

20. The computer readable storage medium of claim 18, wherein:
multiple deviations are identified by the graphical display, the deviations associated with multiple target values;
the graphical display is subdivided according to the target values; and
the graphical display identifies a target type associated with each target value.

\* \* \* \* \*